(12) United States Patent
Bosselmann et al.

(10) Patent No.: US 8,217,663 B2
(45) Date of Patent: Jul. 10, 2012

(54) METHOD FOR DETERMINING THE LAYER THICKNESS OF A TBC COATING OF AT LEAST ONE BLADE OF A NON-POSITIVE-DISPLACEMENT MACHINE, A CORRESPONDING TBC LAYER THICKNESS MEASURING DEVICE FOR CARRYING OUT THE METHOD AND USE OF THE METHOD AND THE TBC LAYER THICKNESS MEASURING DEVICE

(75) Inventors: Thomas Bosselmann, Marloffstein (DE); Klaus Huber, Effeltrich (DE); Andreas Schicht, Erlangen (DE); Michael Willsch, Jena (DE)

(73) Assignee: Siemens Aktiengesellschsft, Munich (DE)

( * ) Notice: Subject to any disclaimer, the term of this patent is extended or adjusted under 35 U.S.C. 154(b) by 413 days.

(21) Appl. No.: 11/990,642

(22) PCT Filed: Jul. 27, 2006

(86) PCT No.: PCT/EP2006/064727
§ 371 (c)(1),
(2), (4) Date: Feb. 19, 2008

(87) PCT Pub. No.: WO2007/020170
PCT Pub. Date: Feb. 22, 2007

(65) Prior Publication Data
US 2009/0134884 A1    May 28, 2009

(30) Foreign Application Priority Data
Aug. 17, 2005   (DE) .......................... 10 2005 038 890

(51) Int. Cl.
*G01R 27/04* (2006.01)
*G01R 27/32* (2006.01)

(52) U.S. Cl. ....................................................... 324/644
(58) Field of Classification Search ................... 324/644
See application file for complete search history.

(56) References Cited

U.S. PATENT DOCUMENTS
4,346,383 A    8/1982    Woolcock et al.
(Continued)

FOREIGN PATENT DOCUMENTS
DE                103 59 930              8/2004
(Continued)

OTHER PUBLICATIONS

Office Action issued in corresponding German Patent Application No. 10 2005 038 890.6-54, mailed on Apr. 19, 2006.
(Continued)

*Primary Examiner* — Amy He
(74) *Attorney, Agent, or Firm* — Staas & Halsey LLP (57) ABSTRACT

A method determines the layer thickness of a TBC coating of at least one blade of a non-positive-displacement machine. To this end, at least one electromagnetic wave is emitted to the surface of the at least one blade, the at least one electromagnetic wave is then at least partially reflected by the at least one blade, and the reflected portion of the at least one electromagnetic wave is received and subsequently processed. In addition, the at least one electromagnetic wave is emitted with a frequency matched to the layer thickness of the TBC coating, and the phase of the at least one electromagnetic wave is compared with the phase of the at least one received electromagnetic wave. The at least one emitted electromagnetic wave undergoes a phase change during reflection and the layer thickness of the TBC coating is determined by the phase comparison.

16 Claims, 6 Drawing Sheets

U.S. PATENT DOCUMENTS

| | | | |
|---|---|---|---|
| 5,381,694 A | | 1/1995 | Glynn et al. |
| 5,497,100 A | * | 3/1996 | Reiser et al. .................. 324/642 |
| 5,818,242 A | * | 10/1998 | Grzybowski et al. ......... 324/642 |
| 6,005,397 A | | 12/1999 | Zoughi et al. |
| 6,207,295 B1 | | 3/2001 | Stowell et al. |
| 7,135,869 B2 | * | 11/2006 | Sergoyan et al. ............. 324/636 |
| 2004/0226351 A1 | | 11/2004 | Schafrik et al. |
| 2005/0198967 A1 | * | 9/2005 | Subramanian .................. 60/803 |
| 2006/0048581 A1 | | 3/2006 | Bosselmann et al. |

FOREIGN PATENT DOCUMENTS

| | | |
|---|---|---|
| EP | 1 494 020 A1 | 1/2005 |
| EP | 1 494 020 | 8/2007 |
| JP | 051966446 A | 8/1993 |
| WO | 01/73472 | 10/2001 |
| WO | WO 01/73472 A2 | 10/2001 |
| WO | 2004/065918 | 8/2004 |
| WO | WO 2004/065918 A2 | 8/2004 |

OTHER PUBLICATIONS

Communication issued by the Japanese Patent Office on Dec. 14, 2010 in the related Japanese Patent Application No. 2008-526470.
Goodge, Adam C., "Lens Focused Microwave Reflectometry Concepts for Ceramic Coating Characterization", M.S. Thesis, University of Virginia, 1997.
Office Action issued by the German Patent Office on Jun. 6, 2011 in the related German patent application.

* cited by examiner

FIG 1

FIG 3 evaluation unit generator

METHOD FOR DETERMINING THE LAYER THICKNESS OF A TBC COATING OF AT LEAST ONE BLADE OF A NON-POSITIVE-DISPLACEMENT MACHINE, A CORRESPONDING TBC LAYER THICKNESS MEASURING DEVICE FOR CARRYING OUT THE METHOD AND USE OF THE METHOD AND THE TBC LAYER THICKNESS MEASURING DEVICE

CROSS REFERENCE TO RELATED APPLICATIONS

This application is based on and hereby claims priority to German Application No. 10 2005 038 890.6 filed on Aug. 17, 2005 and PCT Application No. PCT/EP2006/064727 filed on Jul. 27, 2006, the contents of which are hereby incorporated by reference.

BACKGROUND OF THE INVENTION

The invention relates to a method for determination of the layer thickness of a TBC coating on at least one rotor blade of a continuous flow machine. The invention also relates to a method for determination of the layer thickness of a TBC coating on at least one stator blade of a continuous flow machine. The invention furthermore relates to a corresponding TBC layer thickness measurement apparatus for carrying out the methods, as well as use of the method and of the TBC layer thickness measurement apparatus.

Continuous flow machines, such as steam or gas turbines, are used as thermal power machines in engineering, in order to convert energy stored in a gas flow to mechanical energy, in particular to a rotary movement.

In order to achieve as high an overall energy utilization efficiency as possible, particularly in gas turbines, the gas inlet temperatures from the combustion chamber into the flow channel of the gas turbine are chosen to be as high as possible. By way of example, according to the related art, such gas inlet temperatures are around 1200° C.

In order that the blades which are arranged in the flow channel of the turbine withstand the thermal stress, they are provided with a surface coating, a so-called TBC coating (Thermal Barrier Coating). A blade coating such as this is, however, subject to aging in that it becomes eroded from the blade as a function of the operating life over time, so that the layer thickness decreases continuously. Without the TBC coating, the blade is subject to a very high thermal load, leading to destruction of the blade. This can result in a power reduction or, in the final analysis, damage to the turbine.

WO 2004/065918 A2 specifies a method for determination of the quality of a TBC coating on blades in a continuous flow machine, as well as an apparatus for carrying out the method. In this case, electromagnetic waves are transmitted in the area of the blades, and the component of the electromagnetic waves reflected from the blades is received again and is evaluated. During the evaluation, the intensity of the received electromagnetic waves is determined, and the surface quality of the blades is then determined from this. This method allows the existence of a coating to be verified well. It is virtually impossible to obtain detailed information about the layer thickness, particularly at room temperature, since the amplitude attenuation of the electromagnetic wave is virtually lost in the system noise.

SUMMARY

One possible object is to specify a method, a TBC layer thickness measurement apparatus for carrying out the method, use of the method and use of the TBC layer thickness measurement apparatus, by which the layer thickness of a TBC coating on blades in a continuous flow machine can be determined as accurately as possible, and in particular also during operation.

The inventors propose a method for determination of the layer thickness of a TBC coating on at least one rotor blade of a continuous flow machine wherein at least one electromagnetic wave is transmitted at the surface of the at least one rotor blade, the at least one electromagnetic wave is at least partially reflected from the at least one rotor blade, and the reflected component of the at least one electromagnetic wave is received and processed further.

The method is in this case characterized in that the at least one electromagnetic wave is transmitted at a frequency which is matched to the layer thickness of the TBC coating, the phase of the at least one transmitted electromagnetic wave is compared with the phase of the at least one received electromagnetic wave, with the at least one transmitted electromagnetic wave having its phase changed on reflection, and the layer thickness of the TBC coating is determined by the phase comparison.

The inventors also propose a method for determination of the layer thickness of a TBC coating on at least one stator blade of a continuous flow machine, wherein at least one electromagnetic wave is transmitted at the surface of the at least one stator blade, the at least one electromagnetic wave is at least partially reflected from the at least one stator blade, and the reflected component of the at least one electromagnetic wave is received and processed further, The method is in this case characterized in that the at least one electromagnetic wave is transmitted at a frequency which is matched to the layer thickness of the TBC coating, the phase of the at least one transmitted electromagnetic wave is compared with the phase of the at least one received electromagnetic wave, with the at least one transmitted electromagnetic wave having its phase changed on reflection, and the layer thickness of the TBC coating is determined by the phase comparison.

This makes use of the fact that the phase difference between the transmitted wave and the reflected wave component contains information about the layer thickness of the TBC coating, which can be determined by evaluation of the reflected wave component. The phase difference is in this case dependent on the layer thickness of the TBC coating, to be precise being 0° when no TBC coating is present, and increasing continuously as the layer thickness increases.

It is particularly advantageous to determine not only the layer thickness of the TBC coating on the at least one rotor blade but also the layer thickness of the TBC coating on the at least one stator blade. This allows comprehensive monitoring of those components of the continuous flow machine which are subject to particular loading.

It is also advantageous for the layer thickness of the TBC coating on the blades to be determined from the value of the phase change. In this case, at least one electromagnetic wave is transmitted at a predetermined frequency or wavelength. In particular $((2n+1)/4)$-times the wavelength, where $n = 0, 1, 2, \ldots$ is in the order of magnitude of $\pm 50\%$, preferably $\pm 20\%$, of the layer thickness in order to create a particularly steep phase gradient, that is to say the ratio of the phase change to the layer thickness change. It is thus possible to determine the layer thickness even with little amplitude attenuation. As the layer thickness of the TBC coating decreases, the phase change, that is to say the phase difference between the transmitted wave and the reflected wave component, decreases.

It is also advantageous to determine at least one resonant frequency, with the phase change at the resonant frequency corresponding to a value of $(360°\cdot n+1800)$ where $n= 0, 1, 2, \ldots$ and to determine the layer thickness of the TBC coating on the blades from the value of the at least one resonant frequency. Since a resonant frequency is in each case associated with a phase change of $(360°\cdot n+180°)$, and the resonant frequency is dependent on the layer thickness, determination of at least one resonant frequency provides the desired layer thickness information, by the phase change of $(360°\cdot n+180°)$. This is because the associated wavelength in the transmitted electromagnetic wave is actually $(4/(2n+1))$-times as great at the respective resonant frequency than the thickness of the TBC coating.

In this case, it is advantageous to use a single device for production of the at least one electromagnetic wave for reception of the reflected at least one electromagnetic wave. The space saving obtained in this way makes it possible to fit a plurality of combined transmitting and receiving units at different points in the continuous flow machine. For example, it is possible to have devices for transmission and reception of electromagnetic waves arranged distributed over the circumference of the continuous flow machine, in which case an arrangement can be provided as required.

It is advantageous to provide at least one millimetric wave in the frequency range from 30 GHz to 130 GHz, in particular from 50 GHz to 90 GHz, as at least one electromagnetic wave. The wavelengths of the electromagnetic waves at frequencies from this frequency range are therefore in the typical order of magnitude of the layer thickness of the TBC coating, thus ensuring a particularly pronounced phase change on reflection.

The layer thickness of the TBC coating can advantageously be determined during operation of the continuous flow machine. This allows on-line layer thickness measurement thus allowing action at an appropriate time when a risky decrease in the TBC coating is recorded. This makes it possible to avoid the continuous flow machine being shut down for times required to carry out precautionary testing of the TBC coating or else repair measures on damaged blades.

According to this plan, the TBC layer thickness measurement apparatus for carrying out the methods is proposed, having
- at least one unit for production of an electrical oscillation,
- at least one unit for production of electromagnetic waves from the oscillation,
- at least one unit for reception of electromagnetic waves and
- an evaluation unit for evaluation of the electromagnetic waves which can be received, designed such that
- the evaluation unit compares the phase of the at least one transmitted electromagnetic wave with the phase of the at least one received electromagnetic wave.

The TBC layer thickness measurement apparatus results in the advantages as explained above for the method.

The unit(s) for production of the at least one electromagnetic wave and reception of the reflected at least one electromagnetic wave are advantageously arranged in a flow channel in the continuous flow machine. They may each be formed by antennas which are suitable for production and transmission, as well as for reception, of electromagnetic millimetric waves. The unit for production of an electrical oscillation may, for example, be formed by an electronic oscillator which is operatively connected to the antenna for production of the at least one electromagnetic wave. The unit for reception of electromagnetic waves is preferably operatively connected to an evaluation unit which is able to use the signals produced by the unit for reception to determine the layer thickness of the TBC coating on the blades. Furthermore, it is feasible for the at least one unit for production of the at least one electromagnetic wave and the at least one unit for reception of the reflected at least one electromagnetic wave to be arranged outside the flow channel of the continuous flow machine. The at least one electromagnetic wave which is produced is then transmitted into the flow channel via at least one waveguide which is arranged in an appropriate position in the flow channel of the continuous flow machine. The at least one electromagnetic wave which is reflected on the blades is likewise passed via at least one waveguide to the at least one unit for reception.

In this case, it is advantageous for the at least one electromagnetic wave to be transmitted directionally and/or such that it can be focused by the at least one antenna. This ensures a specific layer thickness measurement. Furthermore, this also allows position resolution of the layer thickness measurement on the blades if, furthermore, the antenna is designed such that translational and/or rotary movements of the antenna are possible.

It is also advantageous for the at least one unit for production of electromagnetic waves to be suitable both for transmission and for reception of electromagnetic waves. This makes it possible to reduce the number of components further. For example this allows the at least one unit for production of electromagnetic waves to be operatively connected via a coupling unit to the unit for production of an oscillation. The signals which result from the received electromagnetic waves are supplied via the coupling unit to the evaluation unit. A plurality of coupling unit and antennas can also be provided and, for example, are connected in parallel to a plurality of associated evaluation units or else, using time-division multiplexing, to one evaluation unit, for example.

The continuous flow machine can preferably be a steam or gas turbine. Particularly in the range of large machines, the TBC layer thickness measurement apparatus allows simple, operationally reliable and accurate layer thickness measurement of the TBC coating on the gas turbine blades, thus making it possible to ensure more effective operation and, in particular, to further reduce expensive shut down times resulting from maintenance and repair measures because of TBC coatings and blades having been destroyed. By way of example, this makes it possible to increase the availability of an energy supply equipped with a gas turbine. The apparatus could also be designed such that the effects on the steam or gas turbine in the flow channel of the continuous flow machine are largely kept low.

The inventors also propose a use of the method for determination of the layer thickness of a TBC coating in a steam or gas turbine.

Furthermore, the inventors propose to use the TBC layer thickness measurement apparatus in the flow channel of the continuous flow machine, with the at least one unit for production of electromagnetic waves being arranged in the flow channel of the continuous flow machine.

In this case, it is advantageous for the continuous flow machine to be a steam or gas turbine.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
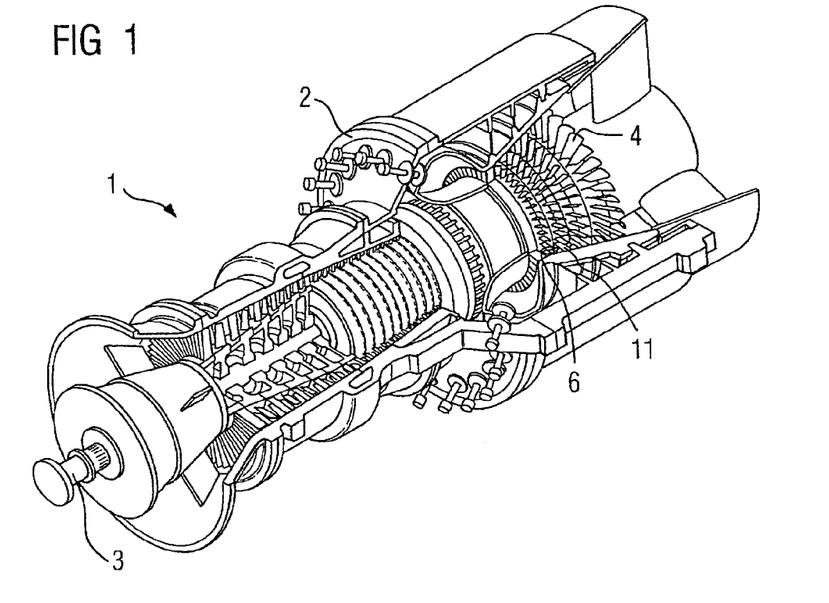
FIG. 1 shows a gas turbine according to the prior art, in the form of a partially sectioned, perspective view.
Figure 4:
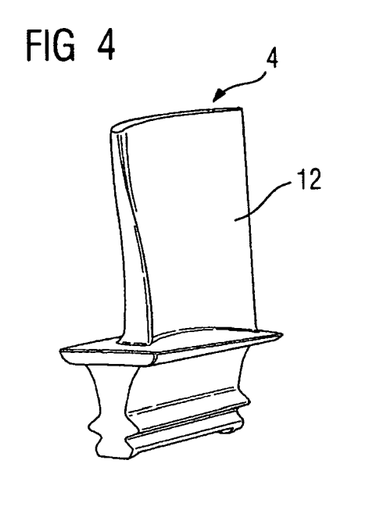
FIG. 4 shows a rotor blade in the gas turbine shown in FIG. 1.
Figure 5:
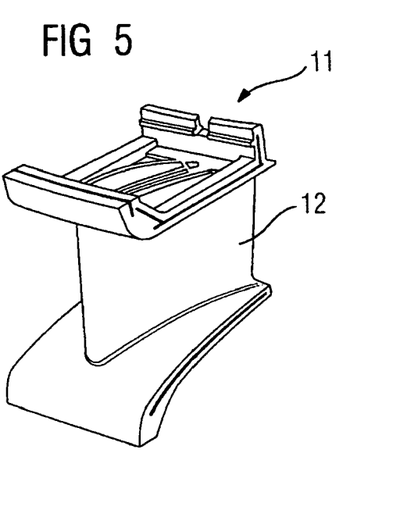
FIG. 5 shows a stator blade of the gas turbine shown in FIG. 1.

FIG. 1 shows a gas turbine 1 according to the related art, which is designed for a high gas inlet temperature of about 1200° C. The gas turbine 1 has rotor blades 4 which are arranged on a rotor shaft 3, which is mounted such that it can rotate in a housing 2. Furthermore, stator blades 11 are provided, and are connected to the housing 2 such that they cannot rotate (see FIG. 4, FIG. 5). The rotor blades 4 and the stator blades 11 are each provided with a TBC coating 12 in order to withstand the physical loads in the flow channel 6 of the gas turbine 1. By way of example, the TBC (TBC: Thermal Barrier Coating) coating 12 is composed of yttrium-stabilized zirconium oxide (so-called YSZ).

Figure 2:
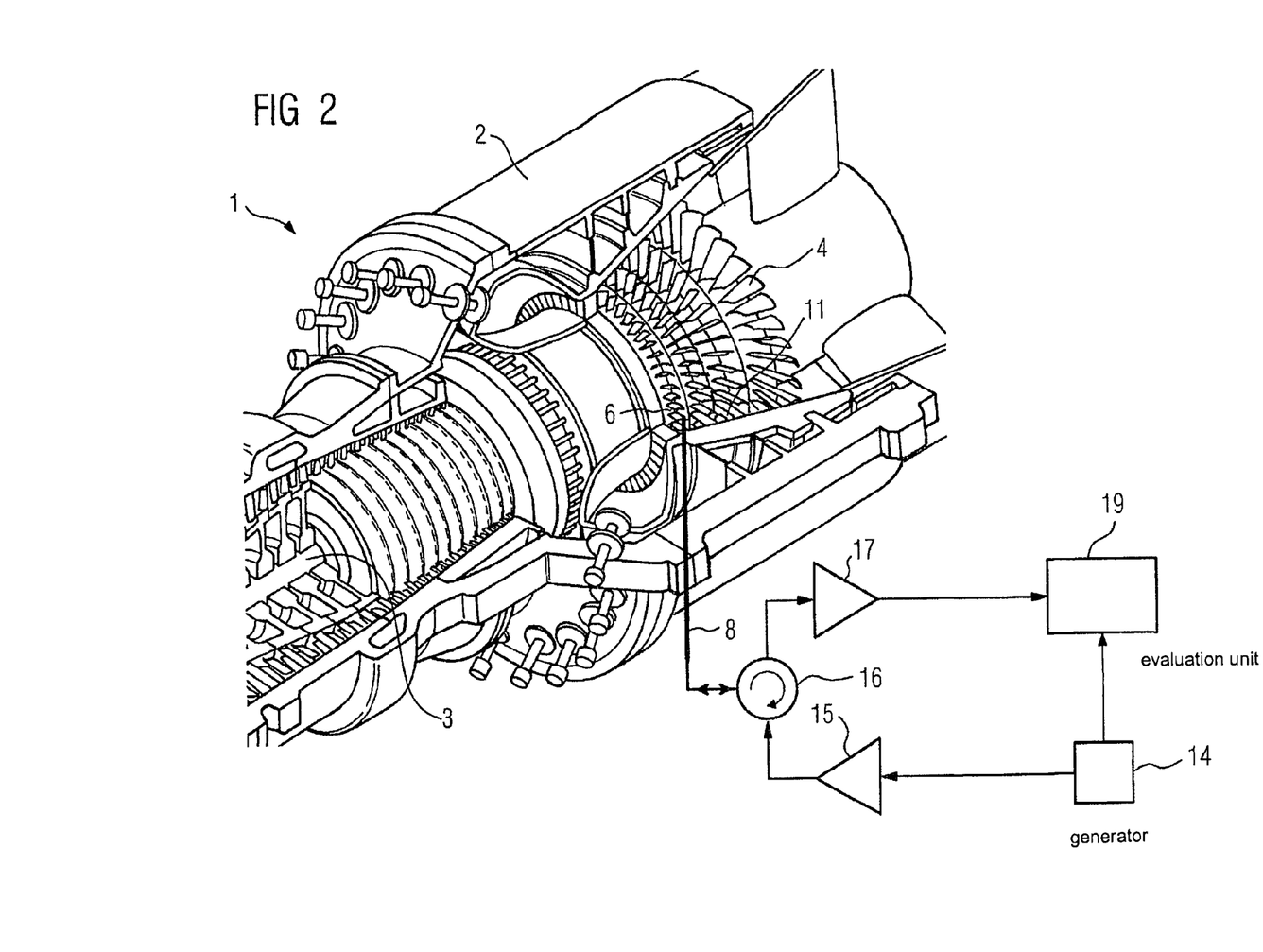
FIG. 2 shows an enlarged view of a detail from the drawing in FIG. 1 with an apparatus according to one potential embodiment of the invention.

As illustrated in FIG. 2, the turbine 1 is equipped with a TBC layer thickness management apparatus according to one potential embodiment of the invention, which has an antenna 8, in particular an antenna designed for millimetric waves, which project into the flow channel 6 of the gas turbine 1. The antenna 8, which is intended in particular for electromagnetic waves at frequencies from 30 GHz to 130 GHz, in particular at frequencies from 50 GHz to 90 GHz, is arranged in the area of the blades 4, 11 to be investigated, in particular between two blade rows. The antenna 8 is used as a device for transmission of electromagnetic waves, and can also be used as a device for reception of electromagnetic waves. The antenna 8 is connected for communication purposes to a circulator 16. The apparatus also has a radio-frequency generator 14, which is operatively connected to the circulator 16 via an amplifier 15. The circulator 16 is connected to a reception amplifier 17, which is coupled to the evaluation unit 19. The evaluation unit 19 is itself in turn connected to the radio-frequency generator 14.

Figure 3:
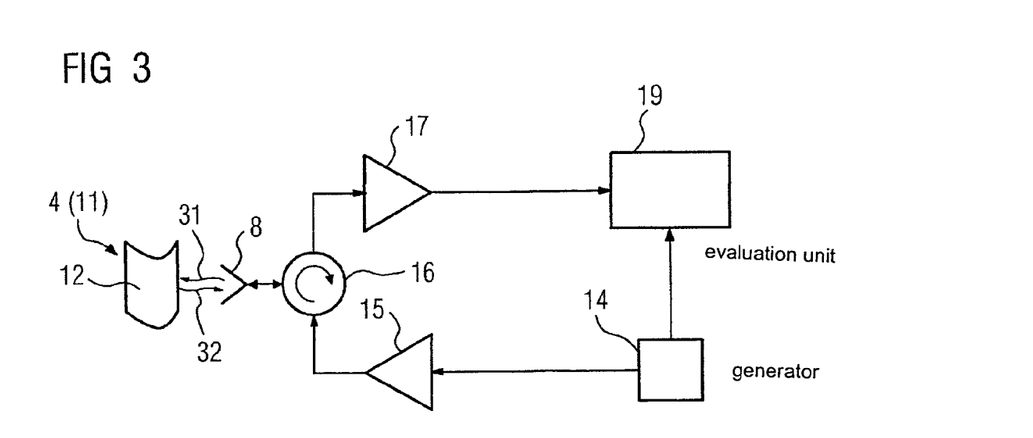
FIG. 3 shows an outline circuit diagram relating to the embodiment of the method.

In detail, the method for determination of the layer thickness of the TBC coating 12 on rotor and stator blades 4 and 11 as shown in FIG. 3 is carried out as follows:

The electronic radio-frequency generator 14 produces a radio frequency and a fixed, predeterminable frequency in the range between 30 GHz and 130 GHz, preferably between 50 GHz and 90 GHz. The radio frequency is supplied to the amplifier 15, which itself supplies the amplified radio frequency via the circulator 16 to the antenna 8. The antenna 8 uses the radio-frequency energy supplied to it to produce at least one corresponding electromagnetic wave 31, and transmits this preferably directionally and in particular focussed, on the basis of its polar diagram characteristic. At least one corresponding blade 4, 11 reflects a component 32 of the transmitted at least one electromagnetic wave 31 back, in particular, to the same antenna 8. The reflected electromagnetic waves 32 are converted via the antenna 8 back to an electrical signal, which is supplied to the circulator 16. The circulator 16 now separates the received signal from the transmitted signal, and supplies this to the reception amplifier 17. The signal is passed from the reception amplifier 17 to the evaluation unit 19.

Figure 6:
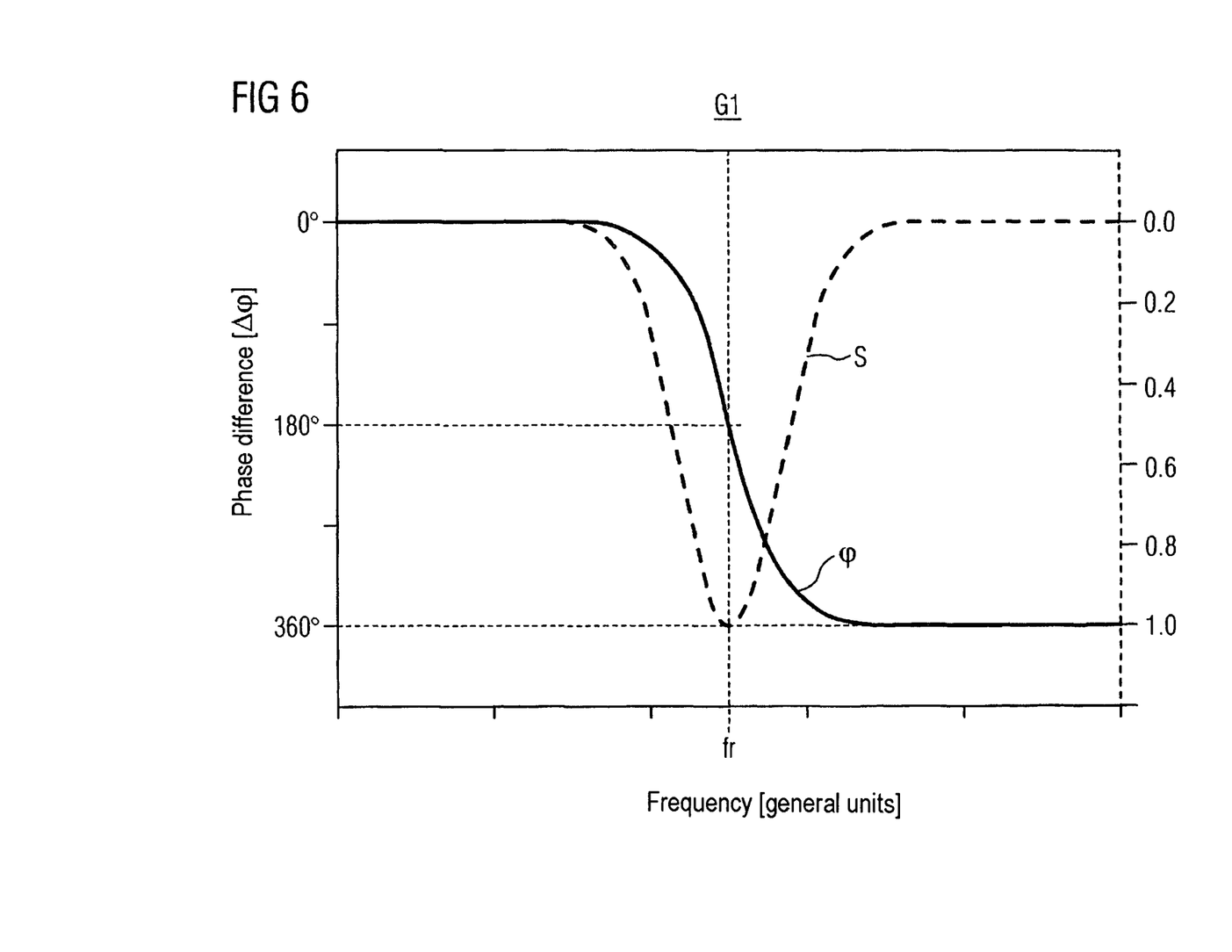
FIG. 6 shows a spectral intensity distribution and a phase profile of reflected electromagnetic waves for the same layer thickness of the TBC coating, as a function of the wave frequency.

A graph G1 in FIG. 6 shows a frequency-dependent spectral intensity distribution S and a corresponding frequency-dependent phase profile (p of a reflected electromagnetic wave 32 when the TBC coating 12 has a constant layer thickness. The dashed-line ordinate indicates the intensity I of the reflected electromagnetic wave 32, while the solid-line ordinate indicates the phase difference $\Delta\phi$ between the transmitted wave 31 and the reflected wave component 32. The frequency is shown on the abscissa. The illustrated intensity distribution has a minimum and a specific frequency fr, the so-called resonant frequency.

At this resonant frequency fr, ¼ of the wavelength of the electromagnetic wave 31, 32 in the TBC coating 12 corresponds precisely to the layer thickness of the TBC coating 12. In this case, the components of the transmitted electromagnetic wave 31 which are reflected on the surface of the TBC coating 12 and the components of the transmitted electromagnetic wave 31 which are reflected on the boundary surface between the TBC coating 12 and the metal located underneath it at least partially cancel one another out. The phase profile $\phi$ shows a phase difference $\Delta\phi$ of 0° at low frequencies, increasing continuously towards higher frequencies. The phase profile $\phi$ has the highest gradient at the resonant frequency fr shown in FIG. 6, with the value of the phase difference $\Delta\phi$ there corresponding to 180°.

In addition to the resonant frequency fr indicated in FIG. 6, there are also further resonant frequencies $fr_n$, which are not illustrated, where n=0, 1, 2, . . . , and $fr=fr_0$. In consequence, ((2n+1)/4)-times the wavelength of the electromagnetic wave 31, 32 in the surface coating corresponds at each resonant frequency $fr_n$ precisely to the layer thickness of the TBC coating 12. The phase difference $\Delta\phi$ at the respective resonant frequency $fr_n$ is then given in a corresponding manner by: $\Delta\phi=(360°\cdot n+180°)$.

Figure 7:
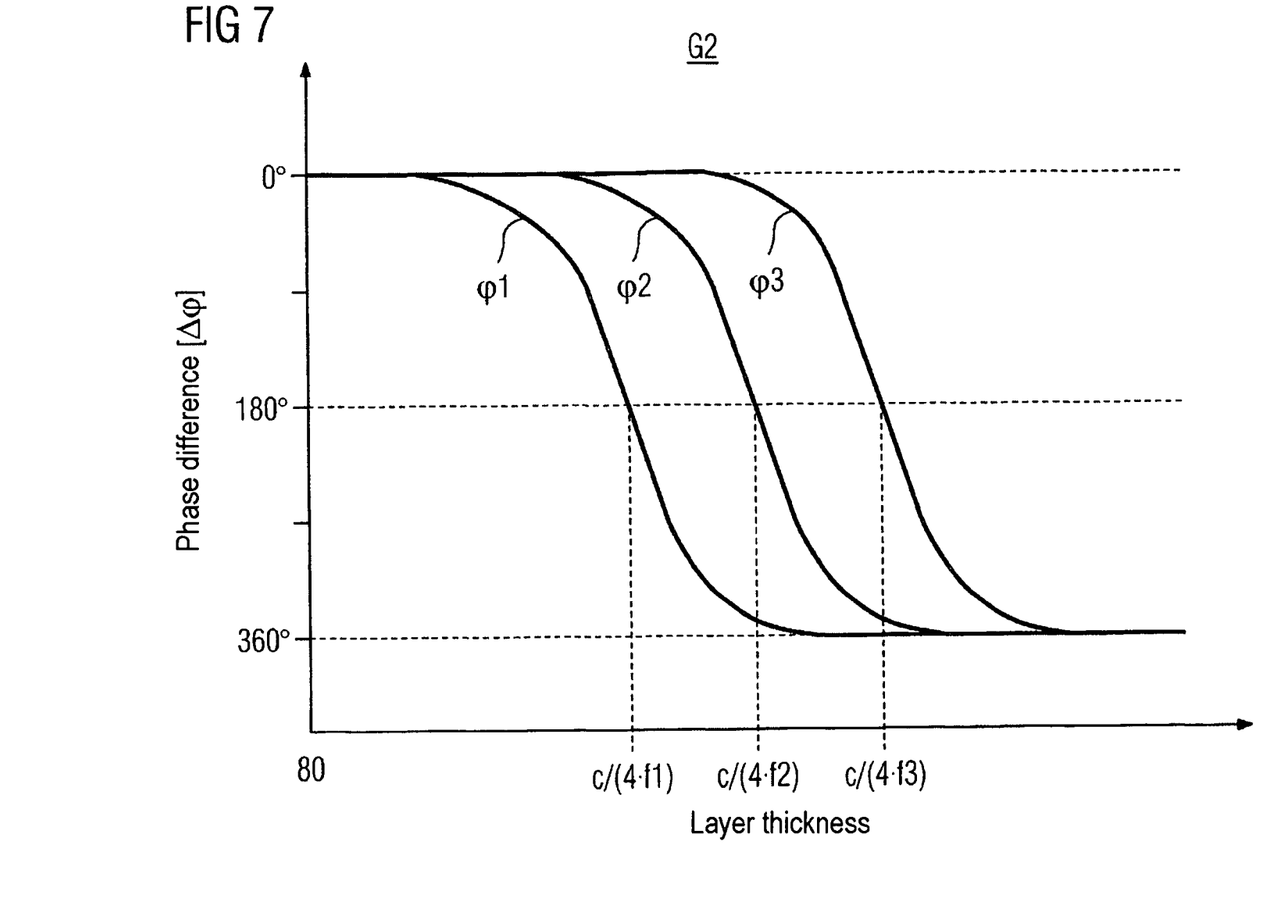
FIG. 7 shows three phase profiles of reflected electromagnetic waves at a different wave frequency as a function of the layer thickness of the TBC coating.

By way of example, a further graph G2 in FIG. 7 shows three phase profiles $\phi1$, $\phi2$ and $\phi3$ of reflected electromagnetic waves 32 at different frequencies f1 (90 GHz), f2 (70 GHz) and f3 (50 GHz), respectively, with the ordinates indicating the phase difference $\Delta\phi$ between the transmitted wave 31 and the reflected wave component 32, and with the layer thickness of the TBC coating 12 being plotted on the abscissa. If there is no TBC coating 12, in precisely the same way as when the layer thicknesses of the TBC coating 12 are low, the phase difference $\Delta\phi$ is 0° for all three frequencies f1, f2, f3. As the layer thickness increases, the phase difference $\Delta\phi$ increases up to a magnitude of 360° in the graph G2 that is shown; in this case, the greatest gradient in all the phase profiles φ1, φ2, φ3 occurs when the phase difference Δφ is 180°. This is where the resonance as described above occurs, to be precise as an example for n=0. When the phase difference Δφ is 180°, the layer thickness of the surface coating 12 corresponds precisely to ¼ of the wavelength of the electromagnetic wave 31, 32 in the TBC coating 12. The frequencies f1, f2, f3 of the electromagnetic waves 32 are then equal to resonant frequencies for the corresponding layer thickness. The respective layer thickness is therefore $c/(4 \cdot fi)$ where i=1, 2, 3, where c is the speed of propagation of the electromagnetic wave 31, 32 in the TBC coating 12.

The evaluation unit 19 is first of all used to determine the phase difference Δφ between the transmitted and the reflected electromagnetic wave 31, 32. The phase difference Δφ is then compared with a previously recorded calibration curve, which, for example, has a phase profile as shown by the graph G2 in FIG. 7, and the layer thickness of the TBC coating 12 is determined from this.

As can also be seen in FIG. 7, the phase profiles φ1, φ2, and φ3 for lower frequencies and therefore also the resonant frequencies are shifted towards greater layer thicknesses.

Figure 8:
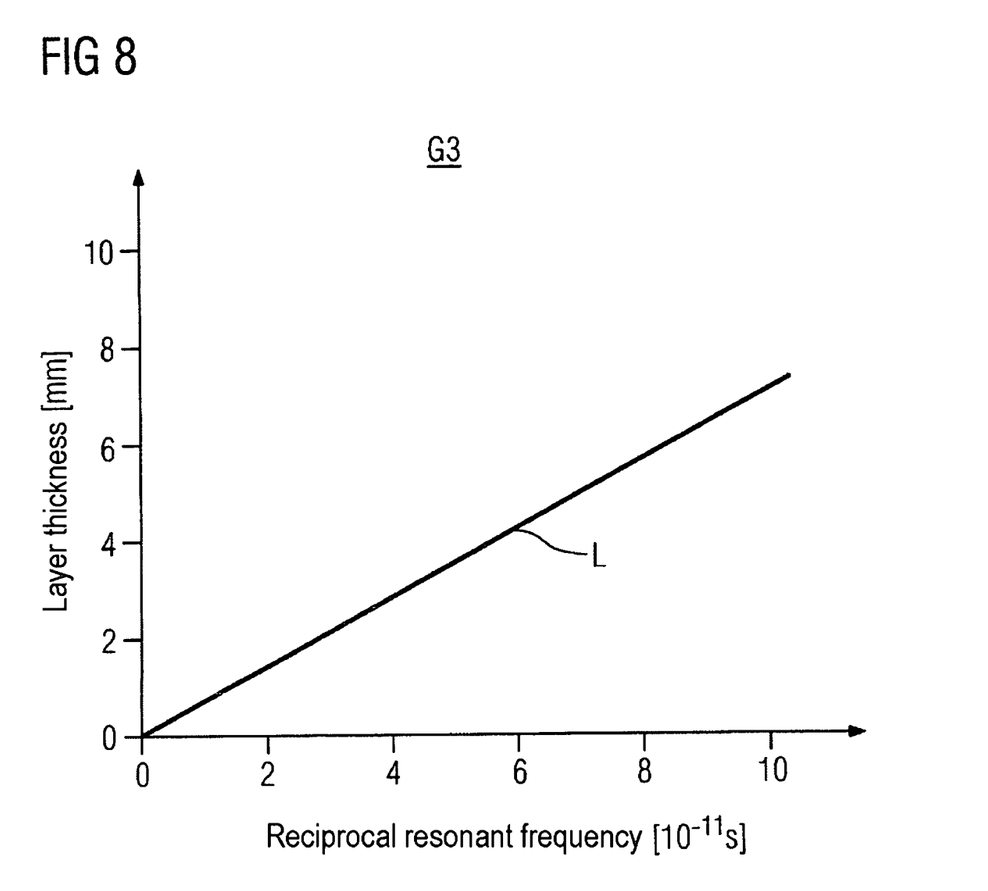
FIG. 8 shows the relationship between a reciprocal of the resonant frequency and the layer thickness of the TBC coating.

A third graph G3 in FIG. 8 shows the relationship between the resonant frequency $fr_n$ and the reciprocal of the resonant frequency $fr_n^{-1}$ and the layer thickness. The ordinate indicates the layer thickness, while the reciprocal of the resonant frequency $fr_n^{-1}$ is plotted on the abscissa. As can be seen, the relationship between the layer thickness and the reciprocal of the resonant frequency $fr_n^{-1}$ is defined by a straight line L. The lower the resonant frequency $fr_n$, or the higher the reciprocal of the resonant frequency $fr_n^{-1}$, the greater is the layer thickness of the TBC coating 12.

It is therefore also possible for the antenna 8 to transmit electromagnetic waves 31 with a broad frequency band, which may be in the range between 30 GHz and 130 GHz, preferably between 50 GHz and 90 GHz, and for the antenna 8, in particular, to receive them again after reflection on the at least one blade 4, 11. After conversion to an electrical signal, these are then supplied via the circulator 16 and the reception amplifier 17 to the evaluation unit 19. The evaluation unit 19 determines the phase differences Δφ between the transmitted and reflected electromagnetic wave 31, 32, and identifies those frequencies $fr_n$ with a phase difference of Δφ=(360°·n+ 180°), in particular when n=0. The reciprocal of these frequencies $fr_n$ is then compared with a previously recorded calibration line, which indicates the relationship between the layer thickness and the reciprocal of the resonant frequencies $fr_n^{-1}$ on the basis of the graph 3 in FIG. 8, and the layer thickness of the TBC coating 12 is determined from this. The phase difference Δφ=180° is associated with the "first" resonant frequency $fr_0$. However, it is also feasible to identify higher-order resonant frequencies $fr_n$ for which n>0, and which occur at higher phase differences Δφ=(360°·n+180°), and to evaluate these in a corresponding manner.

The determined layer thickness of the TBC coating 12 is signaled via display and signaling units, which are not illustrated in any more detail, to a monitoring point, and/or are passed to a control center. The evaluation unit may also be equipped with a comparison function, which can be used to detect that the layer thickness has fallen below a predeterminable threshold value. For example a message can be emitted automatically when the threshold value is undershot in order to initiate an appropriate protective measure, for example shutting down the turbine 1.

Figure 9:
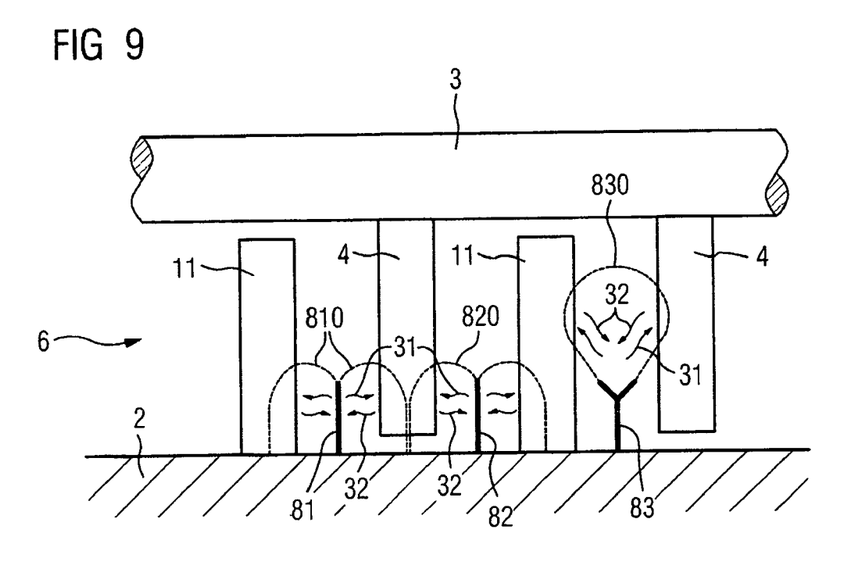
FIG. 9 shows an antenna arrangement for monitoring stator and/or rotor blades.

FIG. 9 shows examples of embodiments and arrangements of different antennas 81, 82 and 83 with the respectively associated polar diagram characteristic 810, 820 and 830. The antennas 81, 82 and 83 are arranged in the flow channel 6, in the area of the rotor blades 4 and/or stator blades 11 to be investigated, between the blade rows. An embodiment as a rod antenna or as a coaxial antenna is appropriate, in particular as a coaxial dipole antenna. Other antenna forms, such as horn antennas, are, however, likewise feasible. The polar diagram characteristic may be symmetrical, as in the case of the antennas 81 and 83, or else asymmetric, as in the case of the antenna 82. In addition to antennas with a broad lobe characteristic, it is also possible to use antennas which can direct the electromagnetic waves 31 and, furthermore, can also transmit them in a focusing form. In particular, this may be done by using the horn antennas that have been mentioned.

The methods and devices described above should not be regarded as being restricted to the exemplary embodiment. The scope of protection likewise includes the provision of a plurality of antennas 8 for transmission and/or for reception, as well, in order, for example, to achieve measurement redundancy or else greater accuracy.

Furthermore, the methods and devices provide the capability for simultaneous layer thickness measurement of the TBC coating 12 on said blades 4, 11.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v DIRECTV, 69 USPQ2d 1865 (Fed. Cir. 2004).

The invention claimed is:

1. A method for determining a layer thickness of a thermal barrier coating (TBC) on at least one rotor blade of a continuous flow machine, comprising:

transmitting an electromagnetic wave at a surface of the rotor blade, the electromagnetic wave being transmitted with an original phase and at a frequency matched to the layer thickness of the TBC coating and being transmitted at a location between two successive blade rows of the continuous flow machine, the frequency being in the range between 30 GHz and 130 GHz;

at least partially reflecting the electromagnetic wave at the rotor blade to produce a reflected component having a changed phase that differs from the original phase;

receiving the reflected component and performing a phase comparison of the original phase with the changed phase; and determining the layer thickness of the TBC coating based on the phase comparison.

2. The method as claimed in claim 1, wherein the TBC coating is provided on both the rotor blade and a stator blade, electromagnetic waves are transmitted at and at least partially reflected by the rotor blade and the stator blade, respectively, and the layer thickness of the TBC coating on the rotor blade and the layer thickness of the TBC coating on the stator blade are determined.

3. The method as claimed in claim 1, wherein the layer thickness of the TBC coating on the blade is determined from a difference between the original phase and the changed phase.

4. The method as claimed in claim 1, wherein the electromagnetic wave has a wavelength within the TBC coating in an order of magnitude of ±20%, of $(4/(2n+1))$-times the layer thickness of the TBC coating, where n=0, 1, 2, . . . .

5. The method as claimed in claim 1, wherein
a resonant frequency is determined with the phase change at the resonant frequency corresponding to a value of (360°·n+180°) where n=0, 1, 2, ..., and
the layer thickness of the TBC coating on the blade is determined from the resonant frequency.

6. The method as claimed in claim 1, wherein the electromagnetic wave is a millimetric wave in a frequency range of from 50 GHz to 90 GHz.

7. The method as claimed in claim 1, wherein the layer thickness of the TBC coating is determined as the continuous flow machine operates.

8. The method as claimed in claim 1 wherein the continuous flow machine is a steam or gas turbine.

9. A method for determining a layer thickness of a thermal barrier coating TBC on at least one stator blade of a continuous flow machine, comprising:
transmitting an electromagnetic wave at a surface of the stator blade, the electromagnetic wave being transmitted with an original phase and at a frequency matched to the layer thickness of the TBC coating and being transmitted at a location between two successive blade rows of the continuous flow machine, the frequency being in the range between 30 GHz and 130 GHz;
at least partially reflecting the electromagnetic wave at the stator blade to produce a reflected component having a changed phase that differs from the original phase;
receiving the reflected component and performing a phase comparison of the original phase with the changed phase; and
determining the layer thickness of the TBC coating based on the phase comparison.

10. An apparatus to determine a layer thickness of a thermal barrier coating (TBC) on a continuous flow machine having rotor blades and stator blades, comprising:
an electric oscillator to produce an electrical oscillation;
a wave generator device to produce electromagnetic waves from the oscillation and to transmit the electromagnetic waves to at least one blade of the continuous flow machine, the wave generator device being disposed at a location between two successive blade rows of the continuous flow machine, the electromagnetic waves being transmitted with an original phase and at a frequency matched to the layer thickness of the TBC coating, the frequency being in the range between 30 GHz and 130 GHz;
a receiver to receive reflected electromagnetic waves reflected by the blade of the continuous flow machine, the reflected waves having a changed phase that differs from the original phase; and
an evaluation unit to evaluate the reflected electromagnetic waves, the evaluation unit comparing the original phase with the changed phase to determine the layer thickness.

11. The apparatus as claimed in claim 10, wherein the wave generator comprises an antenna sized for millimetric waves.

12. The apparatus as claimed in claim 10, wherein the wave generator comprises a directional antenna device to directionally transmit the electromagnetic waves.

13. The apparatus as claimed in claim 10, wherein the wave generator focuses the electromagnetic waves on the blade using at least one antenna.

14. The apparatus as claimed in claim 10, wherein a single device transmits the electromagnetic waves and receives the electromagnetic waves.

15. The apparatus as claimed in claim 10 wherein
the continuous flow machine has a flow channel, and
the wave generator has a wave transmitter positioned in the flow channel of the continuous flow machine.

16. The apparatus as claimed in claim 15, wherein the continuous flow machine is a steam or gas turbine.

* * * * *